US009380740B2

(12) United States Patent
Myers

(10) Patent No.: US 9,380,740 B2
(45) Date of Patent: Jul. 5, 2016

(54) ELECTRIC HANDHELD BROADCAST SPREADER

(71) Applicant: Anthony Myers, San Antonio, TX (US)

(72) Inventor: Anthony Myers, San Antonio, TX (US)

(73) Assignee: Spreader Technology, San Antonio, TX (US)

( * ) Notice: Subject to any disclaimer, the term of this patent is extended or adjusted under 35 U.S.C. 154(b) by 112 days.

(21) Appl. No.: 14/082,929

(22) Filed: Nov. 18, 2013

(65) Prior Publication Data

US 2015/0136870 A1    May 21, 2015

(51) Int. Cl.
| | |
|---|---|
| *A01C 19/00* | (2006.01) |
| *A01C 17/00* | (2006.01) |
| *A01C 7/02* | (2006.01) |
| *A01C 15/02* | (2006.01) |

(52) U.S. Cl.
CPC ............... *A01C 17/001* (2013.01); *A01C 7/02* (2013.01); *A01C 15/02* (2013.01)

(58) Field of Classification Search
CPC .... B05B 7/1418; B05B 7/2483; B05B 13/00; B05B 3/026
USPC .......................................... 239/676, 681, 669
See application file for complete search history.

(56) References Cited

U.S. PATENT DOCUMENTS

| | | | |
|---|---|---|---|
| 2,934,037 A | | 4/1960 | Ernest |
| 3,195,508 A | | 7/1965 | Lehman et al. |
| 3,993,225 A | * | 11/1976 | Manni ............................ 222/324 |
| 4,027,627 A | | 6/1977 | Fillion |
| 4,945,859 A | | 8/1990 | Churchwell |
| 4,986,220 A | | 1/1991 | Reneau et al. |
| 5,143,289 A | | 9/1992 | Gresham et al. |
| 5,820,035 A | | 10/1998 | Johnson et al. |
| 7,222,583 B2 | | 5/2007 | Foster et al. |
| 7,753,293 B2 | | 7/2010 | Farmer |
| 7,849,816 B2 | | 12/2010 | Dollar et al. |
| 7,866,579 B2 | | 1/2011 | Chism |
| 7,954,454 B2 | | 6/2011 | Lewis |
| 2010/0327087 A1 | * | 12/2010 | Harris ........................... 239/653 |

* cited by examiner

*Primary Examiner* — Davis Hwu
(74) *Attorney, Agent, or Firm* — Charles W. Hanor

(57) ABSTRACT

A preferred embodiment of the invention generally comprises a hopper container attached to the top face of a spreader console having an electrically-powered spreader plate positioned within a distribution opening in the front center of the front face of the spreader console and operated with a spreader control switch extending down from the right side of the lower horizontal base of the spreader console. A conventional electric motor is housed in a motor compartment that extends from the center of the lower horizontal base of the spreader console. A conventional battery is housed within a battery compartment located on the left side of the motor compartment. The battery compartment is accessed via an access panel. It is contemplated that the device will be carried by the user in front of his body while walking over the area where the material is to be distributed.

16 Claims, 9 Drawing Sheets

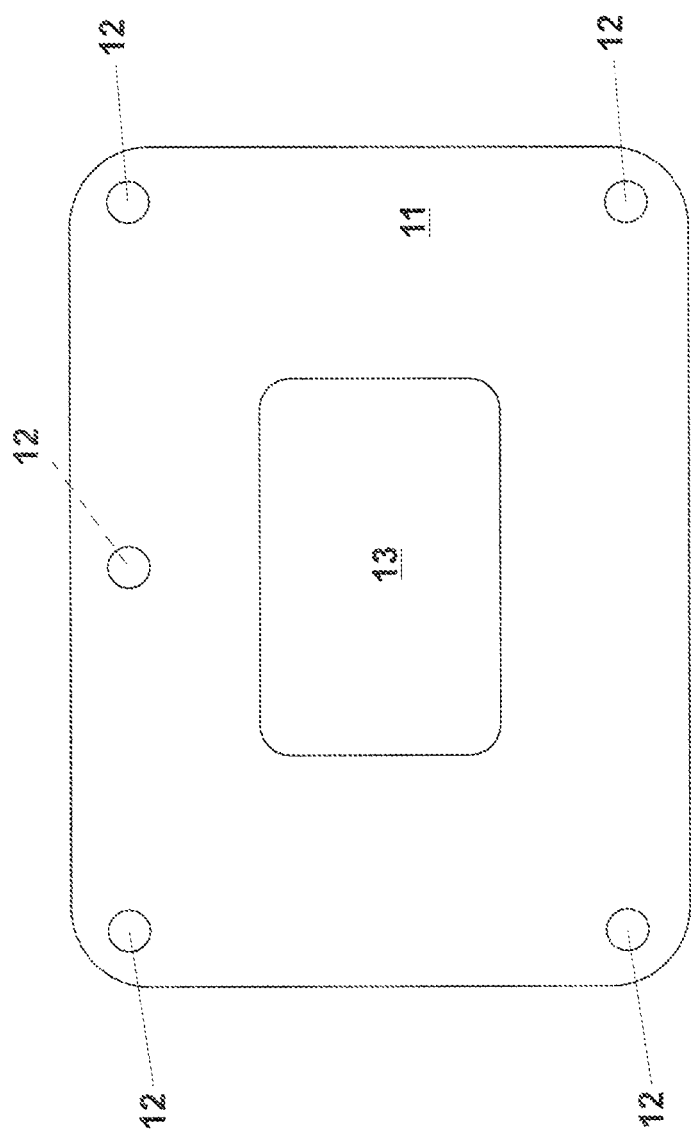

ELECTRIC HANDHELD BROADCAST SPREADER

CROSS-REFERENCE TO RELATED APPLICATIONS

None.

STATEMENTS REGARDING FEDERALLY SPONSORED RESEARCH OR DEVELOPMENT

None.

REFERENCE TO A MICROFICHE APPENDIX

None.

BACKGROUND OF THE INVENTION

1. Field of the Invention

The invention relates to a hand-operated apparatus for broadcast spreading particulate material onto an outdoor surface while a person is walking or standing in place.

2. Description of the Related Art

A broadcast spreader, also known as a rotary spreader, is a device commonly used to distribute particulate material in a calibrated spread pattern onto a variety of outdoor surfaces. The particulate material may be powdered, granulated, or aggregated matter, such as fertilizers, herbicides, pesticides, seeds, pelletized lime, grains, sands, salts, animal feeds, food plot products, and the like. Suitable outdoor surfaces include fields, pastures, golf courses, lawns, roads, driveways, sidewalks, and lands and bodies of water used by domesticated animals, game animals, livestock, wildlife, birds, or fish.

A typical broadcast spreader generally comprises a container having at least one outlet port, a spreader member positioned below the container's outlet port(s), a means for releasing the particulate material from the container, and a means for rotating the spreader member to distribute the particulate material over a given surface area.

U.S. Pat. No. 2,784,962 (John McElhatton): discloses a portable spreader device that may be used to spread fertilizer, grass seed, and like scattery material on lawns. This device is operated by a hand crank that operates the blade equipped rotor, and it has an exterior manually sliding arm that controls the size of the discharge opening, which in turn controls the spread of the material. The instant invention is an obvious improvement over that of McElhatton because the instant one has a lever that simultaneously controls the amount of material that is distributed and operates the apparatus with one motion. Furthermore, the instant invention controls the amount of material that is fed to the spreader plate by controlling the opening that the material is fed through as opposed to controlling the opening that the material is distributed out of. This helps to prevent blockages in the apparatus. Finally, the obvious improvement of the instant invention is the fact the motorized device itself, which makes it much easier for the user.

U.S. Pat. No. 3,592,369 to Christian Albert Huette discloses a combination container and spreader package for particulate material. This device is also worn by the user to spread particulate material, but it is operated so by the use of a handle which rotates a spreader element. However, this invention is drawn to a combination container and spreader package where the material comes already in the container and does not require manual transfer of the material from some other container.

U.S. Pat. No. 3,979,071 to Charles L. Biggs, Jr. discloses an apparatus for broadcasting granular material. It has a hand crank operated drive assembly mounted on the base of the device coupled with a distributor wheel. The distribution of the material is controlled by the speed of the distributor wheel, not the amount of material that is fed to it.

U.S. Pat. No. 4,492,341 to Francis F. Allen discloses a portable hand-held material broadcasting device. It has a manually engageable handle and a storage chamber for flowable granular material superimposed over a normally horizontally rotating impeller for gravitational flow of material from the chamber to the impeller. This device is an improvement on past devices because it allows the operator to adjust the volume of the material flow, the manual operation of the device, and the direction of the distribution simultaneously with only two hands. Furthermore, the installation of a stop element adjacent the actuating member helps to prevent excessive displacement of the actuating member, which can lead to undue stress and eventual breakage. If sufficient force is applied on the actuating member by a user of the device, the actuating member may be displaced from its original set position to an unselected position whereby the valve opening is reset to provide an undesired material flow rate from the device. Finger and/or thumb fatigue often occurs, which can result in a varying amount of material being distributed.

U.S. Pat. No. 5,119,993 to Gunzel et al discloses a portable particulate material spreader that uses an electric motor and a blower chamber to distribute the material. This device discloses the use of different mechanisms to control the flow of either powdery material or granular material.

U.S. Pat. No. 5,123,598 to Courtney et al discloses a portable spreading device with an actuating assembly including an actuating member and a dual spring arrangement interconnected with the actuating member. One of the springs causes material to be discharged onto the impeller in response to movement of the actuating member and prevents damage of the device resulting from excessive movement of the actuating member. The second spring biases the actuating member to move to an idle position in which no material is discharged onto the impeller and causes the actuating member to return to this idle position after movement thereof. This device attempts to solve the problem of not releasing material when the device is not operating. However, the operation of the actuating member can result in fatigue and requires extra care by the user to monitor the distribution of the material because it is manually operated.

U.S. Pat. No. 5,190,225 to Bruce M. Williams discloses a handheld broadcast spreader apparatus that utilizes pneumatic pressure directing granular material from a hopper through a conduit within the outlet conduit.

U.S. Pat. No. 5,820,035 to Johnson et al discloses a broadcast spreader mechanism. It discloses an improved feed distribution and closure mechanism for use with broadcast spreaders that comprises a threaded shaft, a disk mounted on the shaft having a central opening provided with internal threads mating with the shaft, a return spring, and a collar or the like on the shaft to stop travel of the disk on the shaft. An electric motor may be used as a power source to power the shaft so that the disk travels up and down on the shaft. The disk provides a positive closure of feed to the spinning disk as soon as the motive power for the disk is stopped, thus avoiding unwanted spilling of the feed material.

U.S. Pat. No. 7,222,583 B2 to Foster et al discloses a directional broadcast feeder for fish and game. The action of the feeder is controlled to provide a predetermined quantity of aggregate at a predetermined time. The velocity of the feed as it exits is such that the area directly surrounding the feeder is free of feed particulate. The projection of the feed is accomplished by propelling the feed pellets with a center intake centrifugal air blower assembly designed such that no special feed gates, baffles, or chutes are required.

Proper dispersion of granular material is necessary for efficiency in use of material to be dispersed, as well as for proper density in dispersion of the material. As such, it may be appreciated that there continues to be a need for a new and improved broadcast spreader apparatus as set forth by the instant invention which addresses both the problems of ease of use as well as effectiveness in construction in directing granular material in a various pattern. The instant invention attempts to address the aforementioned goals and problems of the prior art utilizing a device that comprises a spreader console that has an electric switch that simultaneously activates the opening of the panel that allows the feed to fall to the spreader plate and the spinning of the spreader plate.

BRIEF SUMMARY OF THE INVENTION

The instant invention discloses a handheld broadcast spreader that comprises a hopper container and a spreader console attached to the hopper container. The spreader console comprises a motor for spinning a spreader plate connected to the motor and a distribution opening through which material is distributed. The distribution opening comprises an opening above the spreader plate with a closure member that closes and opens the passageway to the distribution opening to feed material to the spreader plate. A spreader control switch turns on the motor to spin the spreader and also opens the closure member on the opening above the spreader plate to cause material to flow onto the spreader plate and out of the distribution opening to spread material from the distribution opening when the closure member is opened and the spreader plate spins and also closing the closure member when the switch control is turned off.

The handheld broadcast spreader further comprises a horizontal track that comprises an opening that aligns with the bottom of the funnel shaped opening when the spreader control switch is pushed upward in order to control the amount of material that flows from the hopper container to the spreader plate to be distributed. The horizontal track connects to a vertical grooved track that is pushed upward by the upward motion of the spreader control switch that then causes the horizontal track to move back and forth. The spreader control switch comprises a lever that is adjusted horizontally in order to control the horizontal movement of the horizontal track and the alignment of the opening with the funnel shaped opening. The horizontal adjustment of the lever controls the alignment of internal grooves in order to limit the vertical motion of the lever, which in turn limits the alignment of the horizontal track opening with the funnel shaped opening in order to control the amount of material distribution.

This invention further comprises a handheld broadcast spreader that further comprises springs, wherein the upward motion of the spreader control switch compresses the springs that elevate switch levers associated with each spring in order to complete the circuit and activate the motor.

The spreader plate further comprises one or more evenly spaced vertical spreader flaps. The vertical spreader flaps comprise an angled face to direct the flow of material in an outward direction. Furthermore, the spreader plate has a raised center portion to direct the flow of material in an outward direction. The spreader plate is connected to the motor via a motor shaft that rotates the spreader plate when the lever is pushed up and the motor is activated.

The spreader console further comprises a generally rectangular shape and a compartment that extends below the spreader console that comprises a motor compartment and a battery compartment. Additionally, a generally rectangular spreader control switch extends below the console that is easily manipulated by the user.

BRIEF DESCRIPTION OF THE SEVERAL VIEWS OF THE DRAWINGS

FIG. 9 is a top perspective of the base of the hopper container showing the opening that the material goes through to reach the spreader plate.

DETAILED DESCRIPTION OF THE INVENTION

Figure 1:
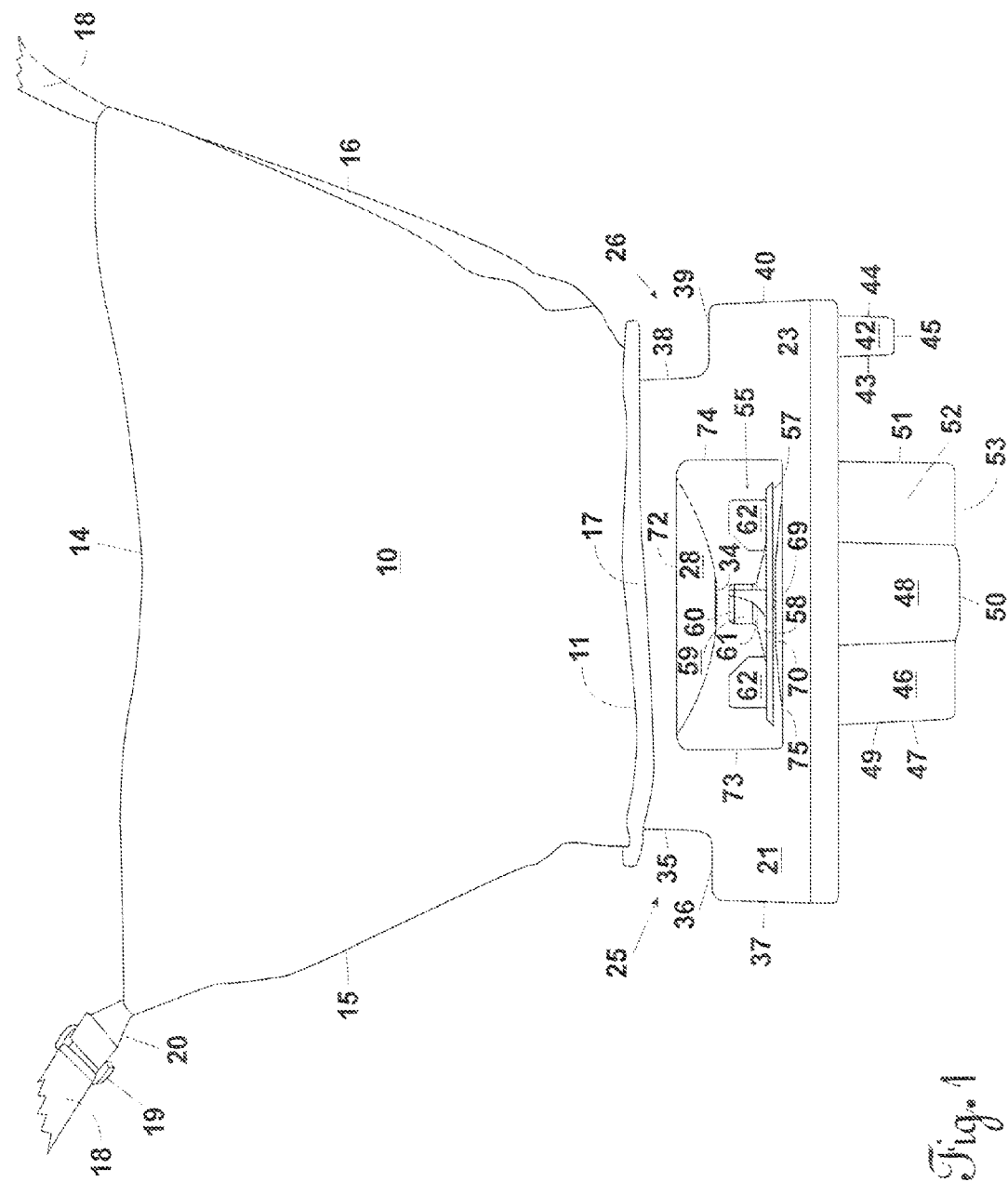
FIG. 1 is a front view drawing of the invention showing the claimed broadcast spreader attached to a hopper container.

While the present invention is open to various modifications and alternative constructions, the preferred embodiment shown in the drawing will be described herein in detail. It is understood, however, that there is no intention to limit the invention to the particular form disclosed. On the contrary, the intention is to cover all modifications, equivalent structures and methods, and alternative constructions falling within the spirit and scope of the invention as expressed in the appended claims.

Figure 2:
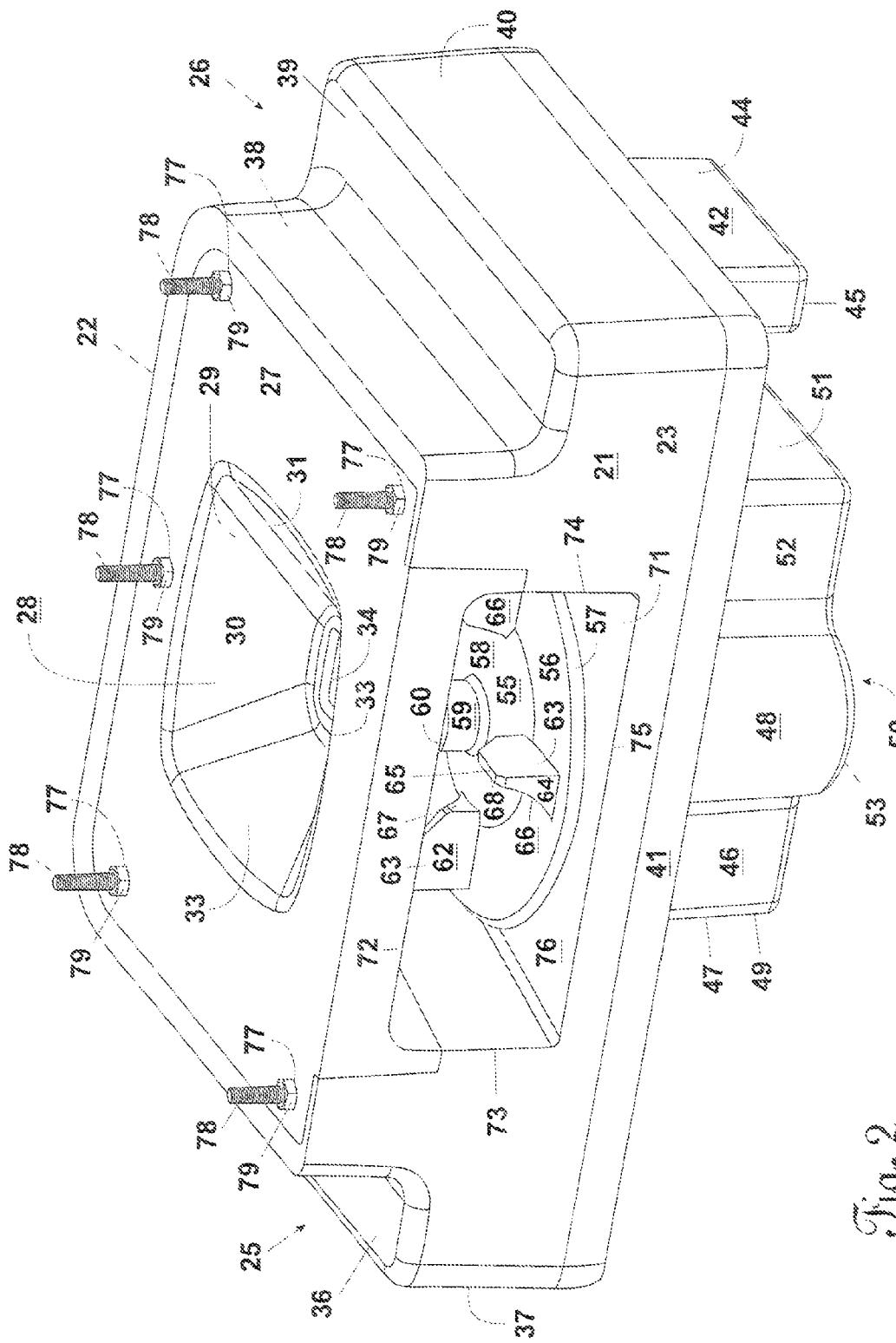
FIG. 2 is an isometric drawing of the invention showing the claimed broadcast spreader not attached to a hopper container.

A preferred embodiment of the invention as shown in FIG. 1 generally comprises a trapezoidal gravity-fed hopper container 10 attached to the rectangular top face 27, shown in FIG. 2, of a rectangular spreader console 21 having an electrically-powered circular spreader plate 55 positioned within a rectangular distribution opening 71 in the front center of the front face 23 of the spreader console 21 and operated with a rectangular push button spreader control switch 42 extending down from the right side of the lower horizontal base 41 of the spreader console 21. Rectangular spreader control switch 42 has left vertical face 43, right vertical face 44, and lower horizontal face 45 that acts a push button to activate the switch. A conventional electric motor (not shown) is housed in a rectangular motor compartment 48 that extends from the center of the lower horizontal base 41 of the spreader console 21. A conventional battery (not shown) is housed within a rectangular battery compartment 46 located on the left side of the motor compartment 48. The battery may be a single use replaceable alkaline battery or batteries or may be a rechargeable battery or batteries. Rectangular battery compartment 46 is accessed via access panel 47, part of vertical left face 49 of the rectangular motor compartment. It is contemplated that the device will be carried by the user in front of his body while walking over the area where the material is to be distributed.

As shown in FIG. 1, the electric spreader console 10 has generally ninety degree recesses 25 and 26 in the upper left and right corners of the spreader console for easy gripping of the console. The upper left recess 25 has upper left vertical sidewall 35 and upper left horizontal sidewall 36. Upper left horizontal sidewall 36 extends out and then turns 90 degrees to connect with left vertical sidewall 37 of the spreader console 21. The upper right recess 26 has upper left vertical sidewall 38 and upper right horizontal sidewall 39. Upper right horizontal sidewall 39 extends out and then turns 90 degrees to connect with right vertical sidewall 40 of the spreader console 21. Left vertical sidewall 37 and right vertical sidewall 40 meet with lower horizontal base 41 of the spreader console 21.

As shown in FIG. 2, on the top face 27 of the spreader console, there are five (5) internally threaded holes 77 where five (5) threaded studs 78 are screwed up via internally mated threading from the inside of the top face 27 such that they stick upward. The holes 77 are located in the 4 corners of the top face 27, and the fifth hole 77 is located in the center between two of the holes 77 in the corners along the rear face of the spreader console 24. These five internally threaded holes 77 and threaded studs 78 mate with holes 12 in hopper base plate 11 having a generally square opening 13 matching the generally square opening 29 in the top cover of the spreader console 22 and mounted on the top face of the spreader console 27, as shown in FIGS. 1, 2, and 9. Nuts 79 or any other comparable device are used to secure the hopper base 11 to the top face 27 of the spreader console 21 via the threaded studs 78.

Figure 3:
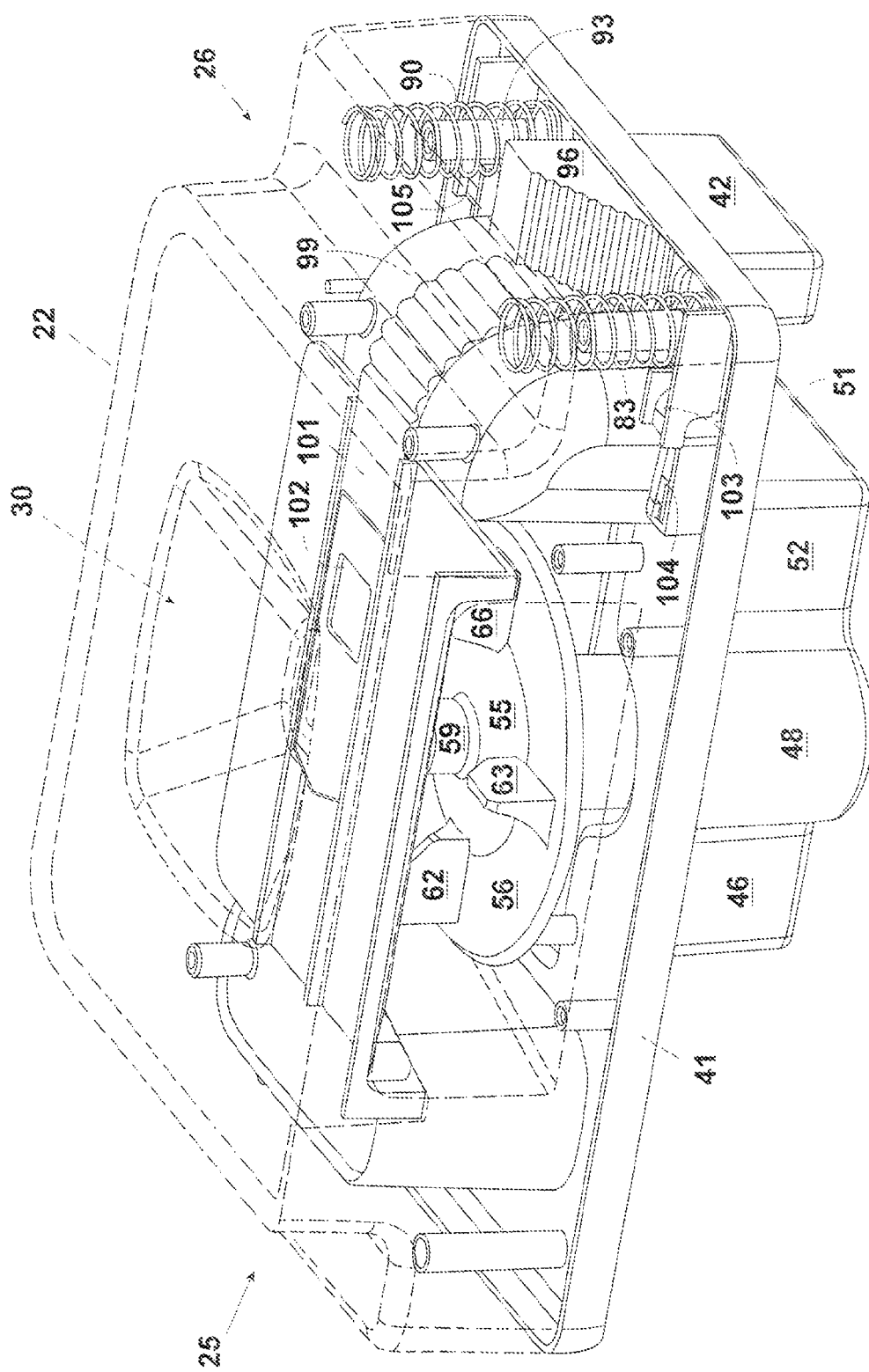
FIG. 3 is an isometric cross-sectional drawing showing the internal components of the claimed broadcast spreader in relation to its external components.

On the top face 27 of the top cover 22 of the spreader console 21, as shown in FIGS. 2 and 3, there is a generally square opening 27 with rounded edges 29 in the center. This opening 29 may be any shape that would best facilitate the flow of the material. This opening 29 tapers down to form a funnel-shaped opening 28 with sidewalls 30, 31, 33, and 32 that angle down and in to meet to form a the bottom opening 34 of the funnel 28 that is square. This bottom opening is small enough to adequately control the amount of material that is distributed to the spreader plate 55. The funnel-shaped opening is not restricted to the aforementioned description. It may be any shape that is known in the art to facilitate the dispensing of material in the downward vertical direction.

As shown in FIG. 1, the hopper 10 is generally shaped like an inverted trapezoid with a circular horizontal base 11 of shorter length than the circular horizontal top 14 and vertical sides 15 and 16 of equal height extending down from the horizontal top 14 at slightly inward angles to the horizontal base 11. A round base cord 17 circumscribes the perimeter of the hopper's horizontal base plate 11 and attaches the bottom of the hopper's vertical sides 15 and 16 around the periphery of the horizontal base plate 22. The base plate 11 is larger in diameter than the rectangular top face of the spreader console 27. There is an opening 13 in the center of the base 11 that is circumscribed by the base cord 17 which engages the periphery of the horizontal base plate 11, as shown in FIGS. 1 and 9. The opening 13 is the same size as or smaller than the top face 29 of the funnel shaped opening 28. This helps direct the flow of the material from the hopper 10 to the funnel shaped opening 28 and down to the spreader plate 55. The hopper's horizontal top 14 has conventional means such as a zipper for sealing particulate material within the hopper 10. The hopper 10 is preferably made of an impermeable fabric such as nylon. The top of the hopper 14 has a padded, nylon shoulder strap 18 that attaches to the top 14 at diametrically opposite points so that the apparatus can be worn over the user's shoulders and around the user's neck such that the distribution opening of the spreader console 71 faces away from the user's body. The shoulder strap 18 is adjusted via the shoulder strap fastener 19 and the shoulder strap anchor 20.

The spreader plate 55 is comprised of an outer ring 56 that circumscribes a raised center portion 58 that then circumscribes a cylindrical center cap 59, as shown in FIGS. 1 and 2. The outer ring 56 extends downward into a side lip 57. The cylindrical center cap 59 has a flared bottom edge 61 that meets the raised center portion 58 and a rounded top edge 60. On the outer ring 56 there are four (4) evenly spaced vertical spreader flaps 62 with vertical back wall 63, vertical outside wall 64 which faces away from the spreader flap, horizontal top wall 65 which is parallel to the spreader plate, angled vertical front wall 66 which starts at the left edge 68 of the horizontal top wall 65 and angles downward to form an obtuse angle with the spreader plate 55, and vertical inside wall 67 which faces the cylindrical center cap 59. The vertical spreader flaps 62 have an angled face or wall 66 in order to direct the flow of the material outward away from the user. There may be as many spreader flaps 62 as are necessary to effectively distribute the material. The spreader plate 55 is connected to the motor 54 via motor shaft 69, which spins when the motor 54 is turned on and therefore causes the spreader plate 55 to spin. Motor shaft 69 extends upward from the center of the raised center portion 70 of the horizontal floor 76 of the distribution opening 71. The distribution opening 71 has upper horizontal sidewall 72, left vertical sidewall 73, right vertical sidewall 74, and lower horizontal sidewall 75.

Figure 8:
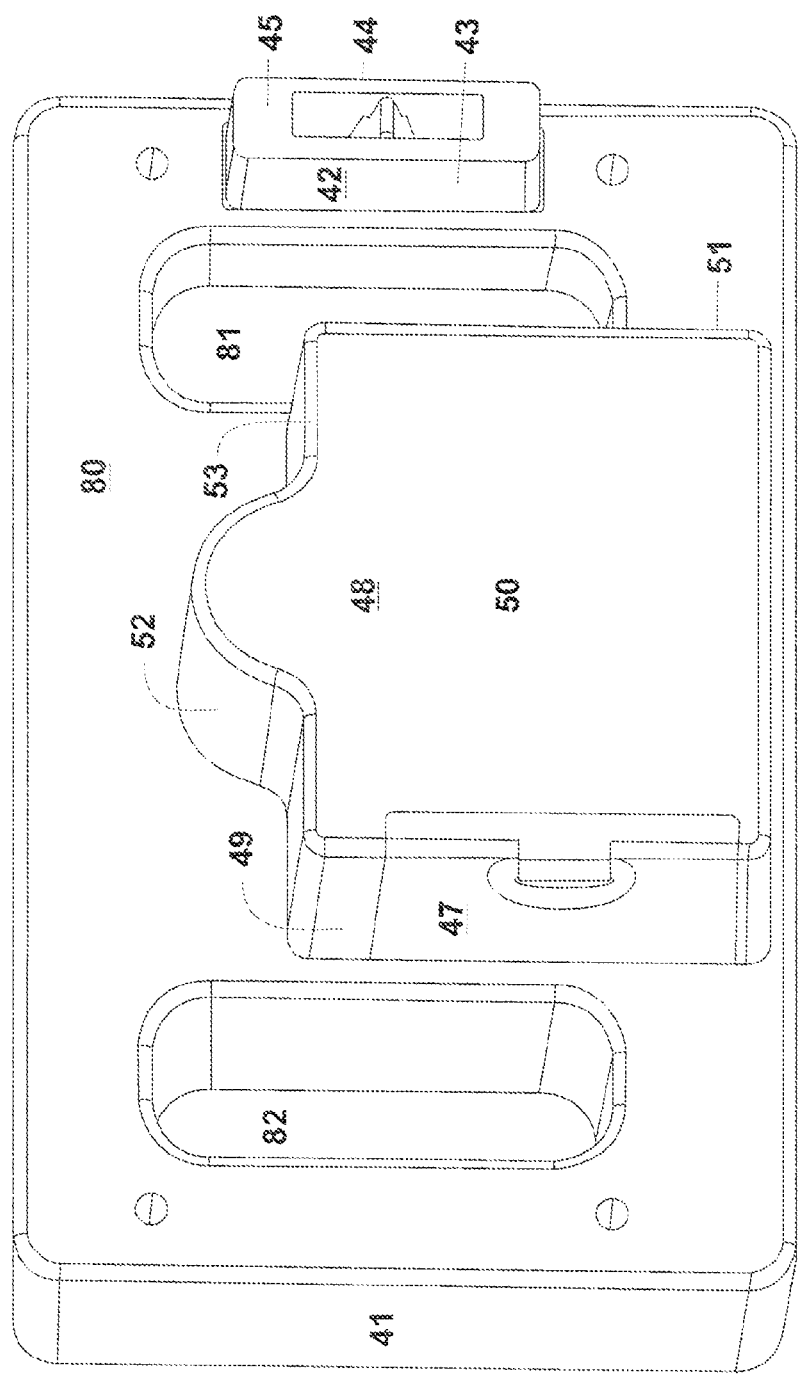
FIG. 8 is a bottom view of the spreader console showing the hand grips and the underside of the motor compartment and battery compartment.

Electric motor compartment 48 has vertical left face 49 and vertical right face 51, which connect to vertical front face 52 and horizontal bottom face 50, as shown in FIGS. 1, 2 and 8. Vertical front face 52 connects to horizontal bottom face 50 via horizontal bottom front edge 53. Vertical front face 52 and horizontal bottom front edge 53 curve out in the center of vertical front face 52 in order to contain the cylindrical motor 54 (not shown) in the motor compartment 48. The motor 54 can be any shape that is best suited to the apparatus, and such a shape can easily be chosen by someone of skill in the art. In this case, a cylindrical motor 54 is chosen because it is the best shape to spin around in order to cause the spreader plate 55 to spin around.

As shown in FIG. 8, on the underside of lower horizontal base 41 of the spreader console 21, there are rectangular indentations 81 with rounded corners for hand grips on either side of the electric motor compartment 48. The user places the shoulder strap 18 over the shoulders and around the neck so that the apparatus hangs from the user's neck with the distribution opening of the spreader console 71 facing outward away from the body. In this position, the spreader control switch 42 is operated by the user's left hand. The user grips the spreader console 21 with the right thumb pressing upper left horizontal sidewall 36 and the right hand fingers wrapped around side 37 curling up underneath lower horizontal base 41 into the indentations 81. The user also grips the spreader console with his left thumb pressing upper right horizontal sidewall 39 and the left hand fingers wrapped around side 40 curling up underneath lower horizontal base 40 into the indentations 82. In this manner, the apparatus is easily operated by the user.

Figure 6:
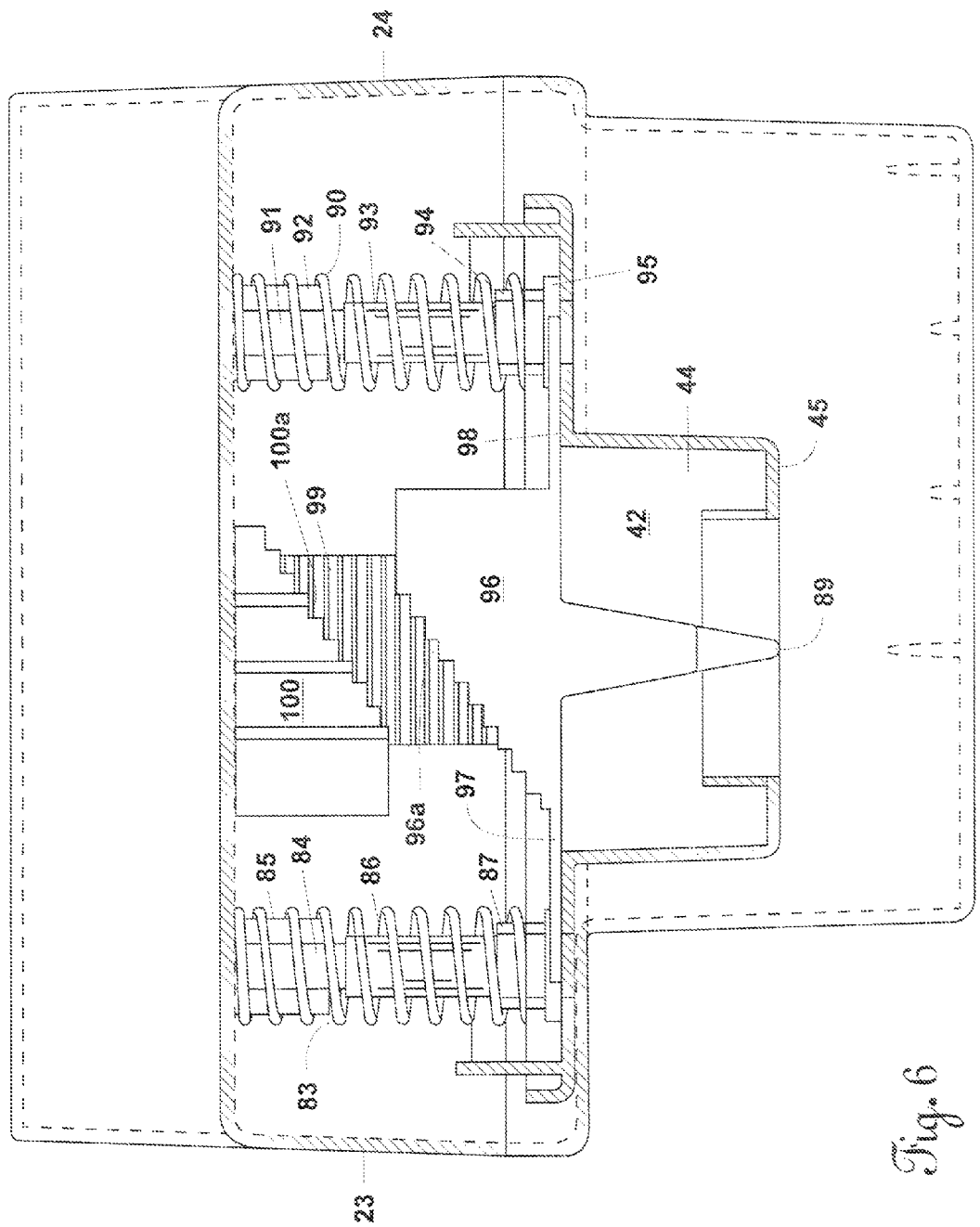
FIG. 6 is a cross-sectional side view drawing showing the internal workings of the spreader control switch when the claimed broadcast spreader is not in use.
Figure 7:
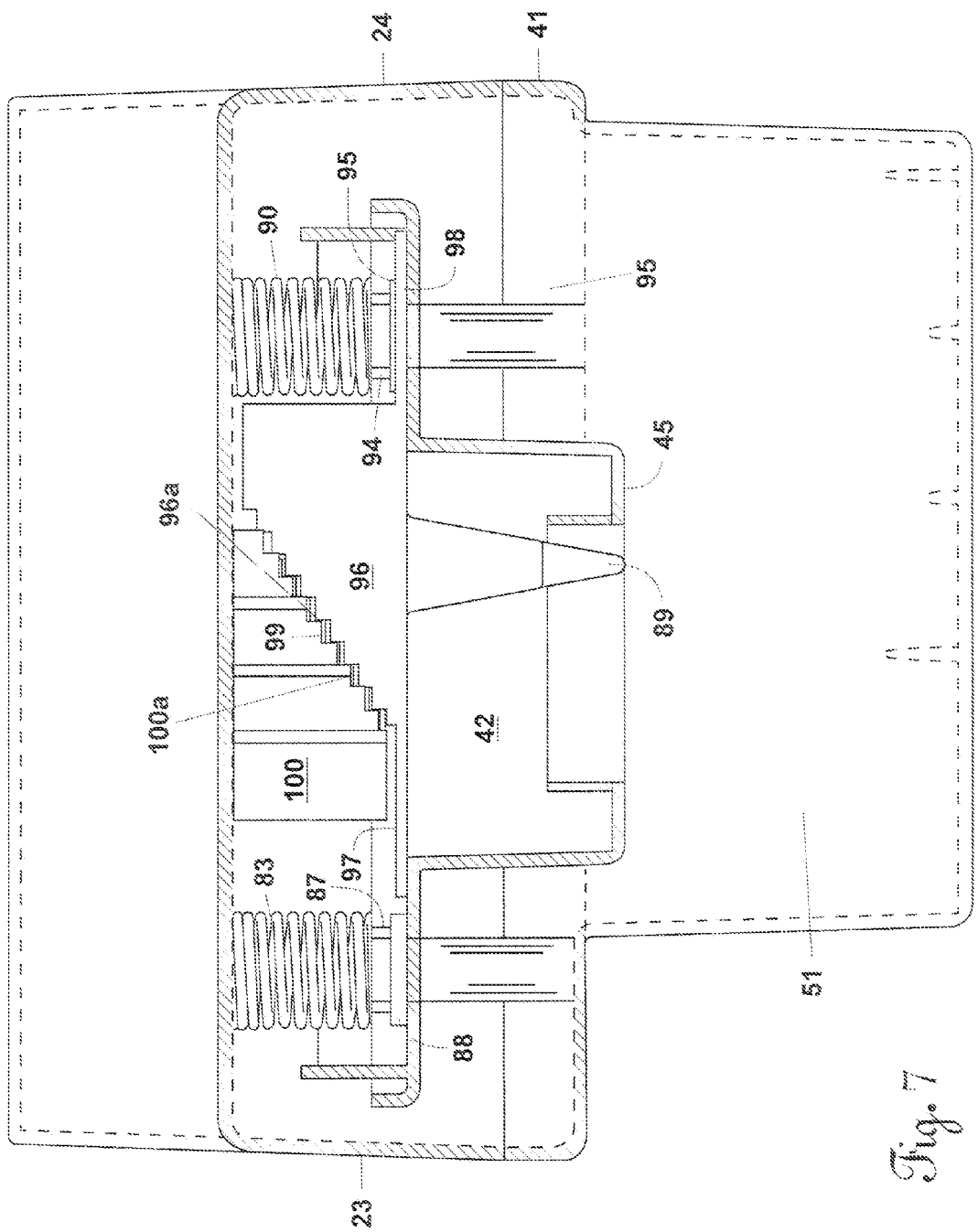
FIG. 7 is a cross-sectional side view drawing showing the internal workings of the spreader control switch when the claimed broadcast spreader is in use.

The spreader control switch 42 is on the right side of the apparatus when looking at the front of the apparatus, as shown in FIG. 1. It has left vertical face 43, lower horizontal face 45, and right vertical face 44. The spreader control switch 42 has lever 89 that is operated by the user, as shown in FIG. 6. Lever 89 can be adjusted horizontally forward or backward relative to the user to various positions in order to control the amount of material that is fed to the spreader plate 55, as shown in FIGS. 6 and 7. On the inside of the spreader console 21, lever 89 extends to a right triangle shaped member 96 with a grooved hypotenuse 96a. The right triangle shaped member 96 has a front arm that extends from lower point of the hypotenuse of the triangle 96a and a back arm that extends backward from the right angle of the triangle 96. The purpose of these arms is to support the lever 89 and the triangle within the spreader console 21 and the spreader control switch 42 so that the lever 89 does not fall out of the opening.

Figure 4:
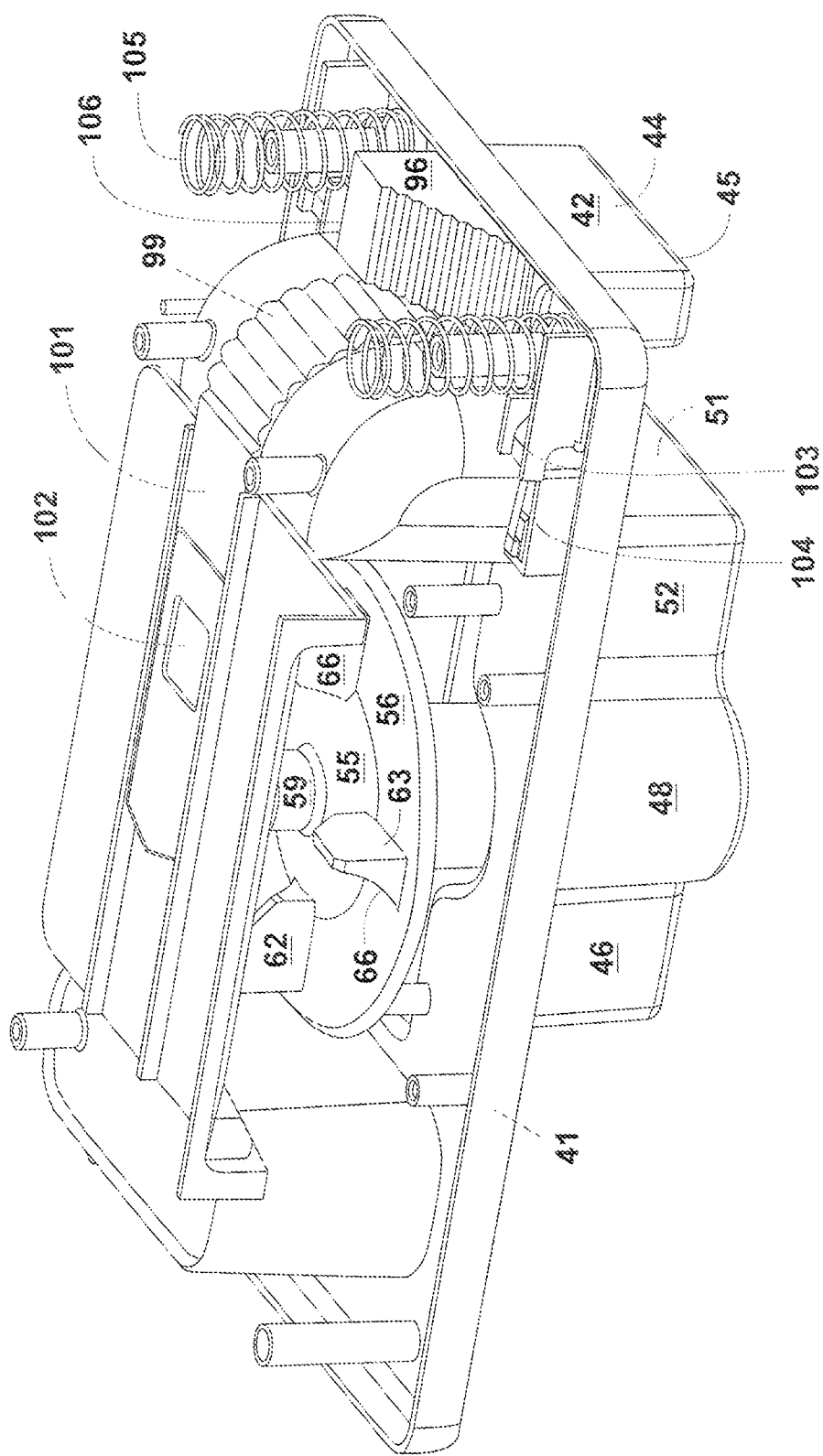
FIG. 4 is an isometric cross-sectional drawing showing the internal workings of the claimed broadcast spreader when it is not in use.

Directly above the grooved right triangle shaped member 96, there is a mutually corresponding upside down right triangle member 100 with a stair stepped hypotenuse 100a. The horizontal position of the lever 89 determines how the right triangle members 96 and 100 contact each other. If the lever 89 is in the most forward position relative to the apparatus, forward being away from the user, the right triangles 96 and 100 only join at the relative tops of each as the lever 89 is pushed upward to activate the motor 48 to turn the apparatus on, as shown in FIG. 6. If the lever 89 is in the most rear position relative to the apparatus, rear being closest to the user, the right triangle members 96 and 100 meet at every point as the lever 89 is pushed upward to activate the motor 48 to turn the apparatus on, as shown in FIG. 7. The more the lever 89 is adjusted horizontally backward towards the user, the more the grooves on the right triangles 96 and 100 fit together, and therefore the more material that is released from the hopper 10 to the spreader plate 55. After adjusting the lever 89 horizontally to the desired position, the user then pushes the lever 89 upward. This action causes the right triangle shaped member 96 to push upward on the vertical grooved track 99 that extends to smooth horizontal track 101 to adjust the horizontal position of track 101. The further forward the lever 89 is, the less it pushes the track 101 horizontally away from the lever so that rectangular hole 102 does not align fully with the bottom opening 34 of the funnel 28 to allow the material to flow from the funnel 28 to the spreader plate 55, as shown in FIG. 4. The further back toward the user the lever 89 is positioned, the more it pushes the track 101 horizontally away from the lever so that rectangular hole 102 aligns fully with the bottom opening 34 of the funnel 28, as shown in FIG. 5.

Figure 5:
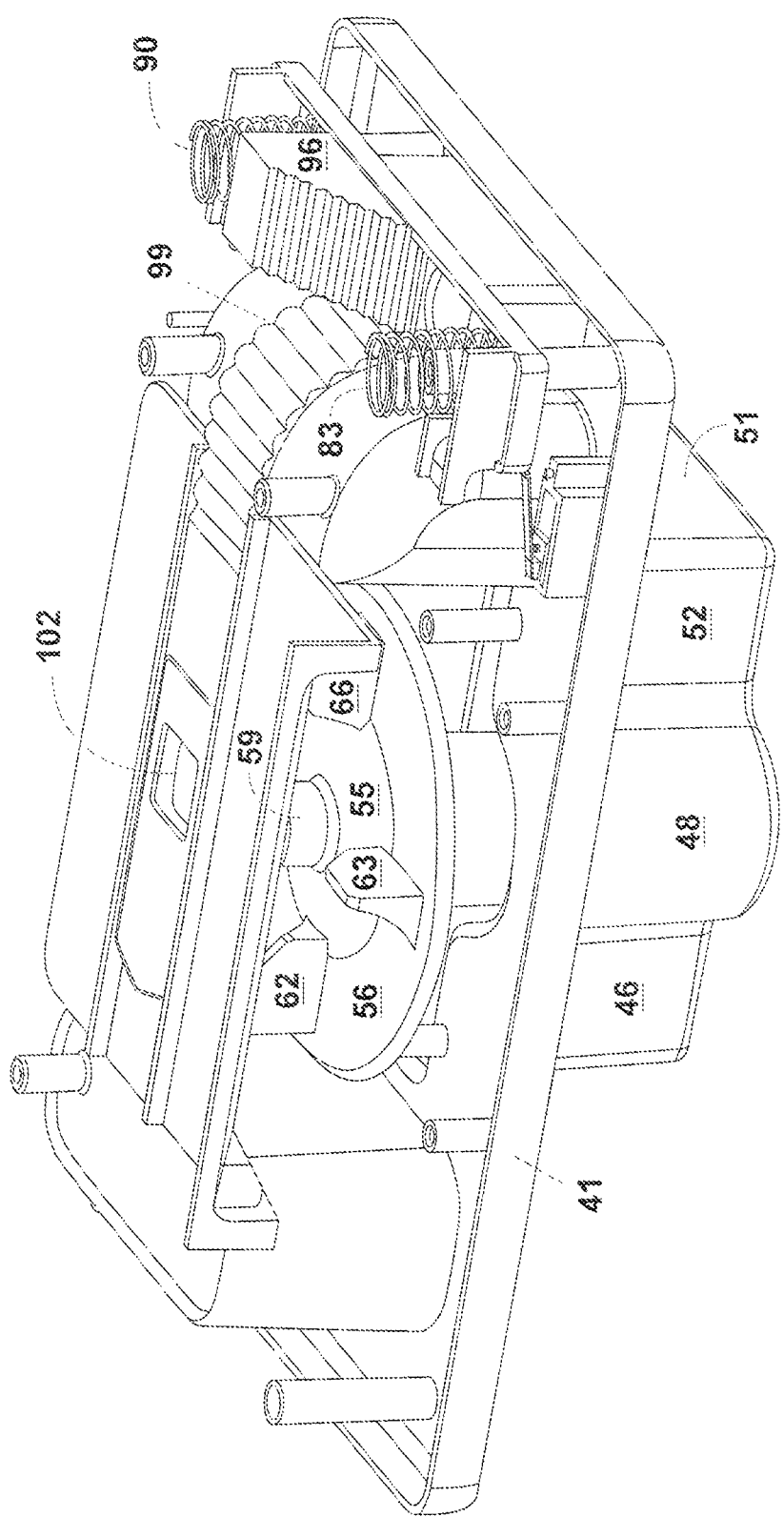
FIG. 5 is an isometric cross-sectional drawing showing the internal workings of the claimed broadcast spreader when it is in use.

The vertical upward motion of the lever 89 also pushes up and compresses front spring 83 and back spring 90, as shown in FIGS. 5 and 7. Front spring 83 is coiled around a network of cylindrical shafts concentrically fitted together. Front inner shaft 84 extends the length of the front spring 83 at rest. The next shaft surrounding front inner shaft 84 is front middle shaft 86, which is in turn concentrically surrounded by front bottom shaft 87. When the spring 83 is fully compressed, front bottom shaft 87 fits into front top shaft 85, and front bottom base 88 meets front top shaft 85 to prevent further compression of the spring. Back spring 90 is coiled around a network of cylindrical shafts concentrically fitted together. Back inner shaft 91 extends the length of the back spring 90 at rest. The next shaft surrounding back inner shaft 91 is back middle shaft 93, which is in turn concentrically surrounded by back bottom shaft 94. When the spring 90 is fully compressed, back bottom shaft 94 fits into back top shaft 92, and back bottom base 95 meets back top shaft 92 to prevent further compression of the spring.

When the springs 83 and 90 are not compressed, the apparatus is off because the lever 103 of front switch 104 and the lever 105 of rear switch 106 that are opened by the springs are closed, as shown in FIGS. 4 and 6. As the springs 83 and 90 are compressed upward by the upward motion of the lever 89, the levers 103 and 105 are raised up to complete the circuit with the motor 48 and the battery 46 to turn the apparatus on. In summary, the lever 89 simultaneously controls the amount of material fed to the spreader plate 55 and turns the apparatus on. As the motor is turned on, the spreader plate 55 spins in order to distribute the material that falls onto it forward out of the distribution opening of the spreader console 71.

The above-listed sections and included information are not exhaustive and are only exemplary of the invention. The particular sections and included information in a particular embodiment may depend upon the particular implementation and the included devices and resources. Although a system and method according to the present invention have been described in connection with the preferred embodiments, it is not intended to be limited to the specific form set forth herein, but, on the contrary, it is intended to cover such alternatives, modifications, and equivalents as can be reasonably included within the spirit and scope of the invention as defined by the appended claims.

The invention claimed is:

1. A handheld broadcast spreader, comprising: a hopper container;
   a spreader console attached to the hopper container;
   the spreader console comprising a motor for spinning a spreader plate connected to the motor, a distribution opening through which material is distributed, and an opening above
   the spreader plate with a closure member that closes and opens the passageway to the distribution opening to feed material from the hopper to the spreader plate; and
   a spreader control switch that turns on the motor to spin the spreader plate when engaged;
   said spreader control switch also having a connection to the closure member to move the closure member from the opening above the spreader plate to an open position when engaged to cause material to flow onto the spreader plate and out of the distribution opening to spread material from the distribution opening when the closure member is opened and the spreader plate spins, and to move the closure member to its closed position when the spreader control switch is disengaged;
   a horizontal track that comprises an opening that aligns with the bottom of the funnel shaped opening when the spreader control switch is pushed upward in order to control the amount of material that flows from the hopper to the spreader plate to be distributed.

2. The handheld broadcast spreader of claim 1, further comprising:
   a vertical grooved track that is pushed upward by the upward motion of the spreader control switch that then causes the horizontal track to move back and forth.

3. The handheld broadcast spreader of claim 2, wherein the spreader control switch comprises a lever that is adjustable in order to control the amount of horizontal movement of the horizontal track and the amount of alignment of the opening with the funnel shaped opening to vary the amount of material distributed from the hopper.

4. The handheld broadcast spreader of claim 3, wherein horizontal adjustment of the lever controls the alignment of internal grooves in order to limit the vertical motion of the lever, which in turn limits the alignment of the horizontal track opening with the funnel shaped opening in order to control the amount of material distribution.

5. The handheld broadcast spreader of claim 1, wherein the upward motion of the spreader control switch compresses springs that elevate switch levers associated with each spring in order to complete the circuit and activate the motor.

6. The handheld broadcast spreader of claim 1, wherein the spreader plate further comprises one or more evenly spaced vertical spreader flaps.

7. The handheld broadcast spreader of claim 6, wherein me vertical spreader flaps comprise an angled face to direct the now of material in an outward direction.

8. The handheld broadcast spreader of claim 6, wherein the spreader plate further comprises a raised center portion to direct the flow of material in an outward direction.

9. The handheld broadcast spreader of claim 1, wherein the spreader plate is connected to the motor via a motor shaft that rotates the spreader plate when the lever is pushed up and the motor is activated.

10. The handheld broadcast spreader of claim 1, wherein the spreader control switch further comprises a push button control.

11. The handheld broadcast spreader of claim 1, wherein the spreader console further comprises a compartment that extends below the spreader console that comprises a motor compartment and a battery compartment.

12. The handheld broadcast spreader of claim 1, wherein the spreader console further comprises a generally rectangular spreader control switch that comprises a lever that is easily manipulated by the user.

13. The handheld broadcast spreader of claim 1, wherein the hopper container comprises a nylon bag.

14. The handheld broadcast spreader of claim 13, wherein the hopper is attached to the spreader console through the use of corresponding holes in the hopper that align with screws in the console.

15. The handheld broadcast spreader of claim 1, further comprising:
  a shoulder strap so that the spreader may be worn around a user's neck in front of the body of the user.

16. A method of spreading material with a handheld broadcast spreader, comprising the steps of:
  engaging a spreader control switch to turns on a motor to spin a spreader plate to broadcast material from a hopper;
  engaging said spreader control switch further to move and align an opening in a horizontal track-from an opening above the spreader plate to an open position when engaged to cause material to flow onto the spreader plate from a hopper and out of a distribution opening to spread material from the distribution opening when the closure member is opened and the spreader plate spins, and to move the closure member to its closed position when the spreader control switch is disengaged in order to control the amount of material that flows from the hopper to the spreader plate to be distributed.

* * * * *